(12) United States Patent
Garcia et al.

(10) Patent No.: US 11,421,654 B2
(45) Date of Patent: Aug. 23, 2022

(54) CONTROL OF A WIND POWER PLANT

(71) Applicant: VESTAS WIND SYSTEMS A/S, Aarhus N (DK)

(72) Inventors: Jorge Martinez Garcia, San Juan de Aznalfarache (ES); Kouroush Nayebi, Ikast (DK); Dumitru-Mihai Valcan, Langå (DK); Mu Wei, Soljberg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 295 days.

(21) Appl. No.: 16/067,786

(22) PCT Filed: Dec. 20, 2016

(86) PCT No.: PCT/DK2016/050451
§ 371 (c)(1),
(2) Date: Jul. 2, 2018

(87) PCT Pub. No.: WO2017/118460
PCT Pub. Date: Jul. 13, 2017

(65) Prior Publication Data
US 2019/0003456 A1    Jan. 3, 2019

(30) Foreign Application Priority Data
Jan. 6, 2016   (DK) .............. PA201670005

(51) Int. Cl.
*F03D 7/04*    (2006.01)
*F03D 7/02*    (2006.01)
(Continued)

(52) U.S. Cl.
CPC .......... *F03D 7/0284* (2013.01); *F03D 7/048* (2013.01); *G05B 15/02* (2013.01); *H02J 3/386* (2013.01);
(Continued)

(58) Field of Classification Search
None
See application file for complete search history.

(56) References Cited

U.S. PATENT DOCUMENTS

2009/0194995 A1    8/2009   Delmerico et al.
2011/0285130 A1*  11/2011   Thisted ................... H02J 3/386
                                                          290/44
(Continued)

FOREIGN PATENT DOCUMENTS

CN    102077437 A    5/2011
CN    103004050 A    3/2013
(Continued)

OTHER PUBLICATIONS

Tarnowski et. al. WO 2014/121794 A1, Power Plant & Energy Storage System for Provision of Grid Ancillary Services, World Intellectual Property Organization, Aug. 14, 2014 (Year: 2014).*
(Continued)

*Primary Examiner* — Kenneth M Lo
*Assistant Examiner* — Istiaque Ahmed
(74) *Attorney, Agent, or Firm* — Patterson + Sheridan, LLP

(57) ABSTRACT

The present invention relates to a method for controlling a wind power plant, WPP, comprising a plurality of wind turbine generators, WTGs, connected to an electrical grid, the method comprising: setting a plant power reference (Ptotal) according to an electrical value of the electrical grid; determining an inertia delta power reference (IRdeltaP) required for the WPP to meet a power demand in response to a change in the electrical value; adding the inertia delta power reference and the plant power reference (Ptotal) to form a power reference (Ptotalref); deriving an overboost reference (PrefOB) as the difference between the power reference (Ptotalref) and an available power value; dispatching the power reference (Ptotalref) to each wind turbine
(Continued)

generator; dispatching the overboost reference (PrefOB) to each wind turbine generator. The invention also relates to a wind power plant control system and a wind power plant comprising a control system.

17 Claims, 7 Drawing Sheets

(51) Int. Cl.
*H02J 3/38* (2006.01)
*G05B 15/02* (2006.01)

(52) U.S. Cl.
CPC . *F05B 2220/706* (2013.01); *F05B 2270/1033* (2013.01); *F05B 2270/1071* (2013.01); *F05B 2270/327* (2013.01); *F05B 2270/335* (2013.01); *F05B 2270/337* (2013.01); *Y02E 10/72* (2013.01); *Y02E 10/76* (2013.01)

(56) References Cited

U.S. PATENT DOCUMENTS

| | | | | |
|---|---|---|---|---|
| 2012/0133132 | A1* | 5/2012 | Yasugi | H02J 3/386 290/44 |
| 2012/0205912 | A1* | 8/2012 | Wakasa | F03D 9/255 290/44 |
| 2012/0310426 | A1* | 12/2012 | Tarnowski | F03D 7/0272 700/287 |
| 2012/0313593 | A1* | 12/2012 | Knuppel | F03D 7/0284 323/234 |
| 2013/0026759 | A1 | 1/2013 | Krueger et al. | |
| 2013/0140820 | A1* | 6/2013 | Tarnowski | H02J 3/46 290/44 |
| 2015/0260159 | A1 | 9/2015 | Jimenez Buendia et al. | |
| 2016/0040653 | A1* | 2/2016 | Kang | F03D 7/0284 290/44 |
| 2016/0160839 | A1* | 6/2016 | Wang | F03D 9/255 290/44 |

FOREIGN PATENT DOCUMENTS

| | | |
|---|---|---|
| EP | 2532888 A1 | 12/2012 |
| EP | 2634422 A1 | 9/2013 |
| WO | 2017118460 A1 | 7/2017 |

OTHER PUBLICATIONS

PCT Notification of Transmittal of the International Search Report and The Written Opinion of the International Searching Authority, or the Declaration for Application No. PCT/DK2016/050451 dated Mar. 23, 2017.
Baccino Francesco et al: "An Optimal Model-Based Control Technique to Improve Wind Farm Participation to Frequency Regulation", IEEE Transactions on Sustainable Energy, IEEE, USA, vol. 6, No. 3, Jul. 1, 2015 (Jul. 1, 2015), pp. 993-1003, XP011584826, ISSN: 1949-3029, DOI: 10.1109/TSTE.2014.2327243 [retrieved on Jun. 17, 2015].
El Itani S et al: 11 Short-term frequency support utilizing inertial response of DFIG wind turbines 11 , Power and Energy Society General Meeting, 2011 IEEE, IEEE, Jul. 24, 2011 (Jul. 24, 2011), pp. 1-8, XP032171587, DOI: 10.1109/PES.2011.6038914 ISBN: 978-1-4577-1000-1 the whole document.
Danish Patent and Trademark Office Technical Examination for Application No. PA 201670005 dated Sep. 14, 2016.
Chinese Office Action for Application No. 201680078171.3 dated Apr. 19, 2019.
Intellectual Property India Office Action for Application No. 201817021293 dated Aug. 1, 2021.

* cited by examiner

CONTROL OF A WIND POWER PLANT

TECHNICAL FIELD

Aspects of the invention relate to the control of a wind power plant, particularly in connection with power boosting or fast increase of active power production.

BACKGROUND OF THE INVENTION

Modern power generation and distribution networks increasingly rely on renewable energy sources, such as wind turbine generators. Beyond merely generating and delivering electrical power, the wind turbine generators are responsible for contributing to grid stability through frequency regulation.

The high penetration of wind turbine generators in the electrical grids has resulted in set requirements for the wind turbine generators, on how they should contribute to the stability of the electrical grids. Such requirements are included in so-called grid codes.

One of the requirements which may be included in certain grid codes is inertia response. Inertia response is a functionality where the power is boosted from the normal production for a short period of time, i.e. power delivered to the electrical grid is increased. The power boost comes from stored kinetic energy in the rotor and is possible due to release of stored kinetic energy from the turbine rotor during the power boost. The boost of power function may be available at all wind speeds. However, for very low wind speeds, the power boost may be rather reduced.

Depending on the grid code, the details of the boost phase may vary. In some locations a boost power should be provided upon request. In an example it may be specified that whenever the production from the wind power plant is above 25% of rated power, the wind power plant has to be able to deliver a power boost of 5-10% of rated power for a given time period, e.g. up to 10 seconds. The grid code may also specify requirements for the recovery period. As an example, after the boost it may be specified that the wind turbine generator must have returned to normal operation after 2 minutes, and that during the recovery phase, the power produced by the wind turbine generator should remain within 80% of available power.

SUMMARY OF ASPECTS OF THE INVENTION

It is an object of the present invention to provide a method and an apparatus to increase power production from a wind turbine generator for a period of time, wherein the method and apparatus in respect of the power increase operate indifferent of the amount of power produced by the wind turbine generator.

In a first aspect, the invention resides in a method for controlling a wind power plant (WPP) comprising a plurality of wind turbine generators (WTGs) connected to an electrical grid, the method comprising:
  setting a plant power reference (Ptotal) according to an electrical value of the electrical grid;
  determining an inertia delta power reference (IRdeltaP) required for the WPP to meet a power demand in response to a change in the electrical value;
  adding the inertia delta power reference and the plant power reference (Ptotal) to form a power reference (Ptotalref);
  deriving an overboost reference (PrefOB) as the difference between the power reference (Ptotalref) and an available power value (Pava);
  dispatching the power reference (Ptotalref) to each wind turbine generator of the plurality of wind turbine generators; and
  dispatching the overboost reference (PrefOB) to each wind turbine generator of the plurality of wind turbine generators.

The electrical value of the electrical grid may be a frequency value. The electrical value may be a value of the frequency of the electrical grid.

In a second aspect, the invention resides in a control system for controlling the control power output of a wind power plant, WPP, including a plurality of wind turbine generators connected to an electrical grid, the control system comprising:
  one or more computer processors;
  a module for setting a plant power reference (Ptotal) according to an electrical value of the electrical grid;
  a module for determining an inertia delta power reference (IRdeltaP) required for the WPP to meet a power demand in response to a change in the electrical value;
  a module for adding the inertia delta power reference and the plant power reference (Ptotal) to form a power reference (Ptotalref);
  a module for deriving an overboost power reference (PrefOB) as the difference between the power reference (Ptotalref) and an available power value;
  a dispatcher for dispatching the power reference (Ptotalref) to each wind turbine generator of the plurality of wind turbine generators; and
  a dispatcher for dispatching the overboost power reference (PrefOB) to each wind turbine generator of the plurality of wind turbine generators.

An advantage of the first and second aspects of the invention is that the method or control system provides two handles (Ptotalref and PrefOB) for controlling the power reference to the wind turbine generators. This improves the response time in the WTGs, as one handle can be prioritized over the other handle.

In a third aspect, the invention resides in a computer program product loadable into an internal memory of at least one digital computer, the computer program product comprising software code portions for performing the steps of the method according to the first aspect or according to any of the embodiments disclosed herein when the computer program product is run on the at least one digital computer.

In a fourth aspect, the invention resides in a wind power plant comprising a plurality of wind turbine generators and a control system according to the second aspect or according to any of the embodiments disclosed herein.

In a fifth aspect, the invention resides in a method for controlling a wind turbine generator connected to an electrical grid, the wind turbine generator having a rotor, the method comprising:
  requesting a change in power production from the wind turbine generator by using a power reference (Ptotalref) and an overboost power reference (PrefOB);
  wherein the wind turbine generator is responding first to the overboost power reference (PrefOB), then to the power reference (Ptotalref); and
  gradually changing the request for change in power production by decreasing the overboost power reference (PrefOB) and increasing the power reference (Ptotalref), so as to maintain the change in power production.

DESCRIPTION OF EMBODIMENTS

The present invention will now be explained, for exemplary purposes, in further details by way of embodiments and with reference to the enclosed drawings.

Figure 1:
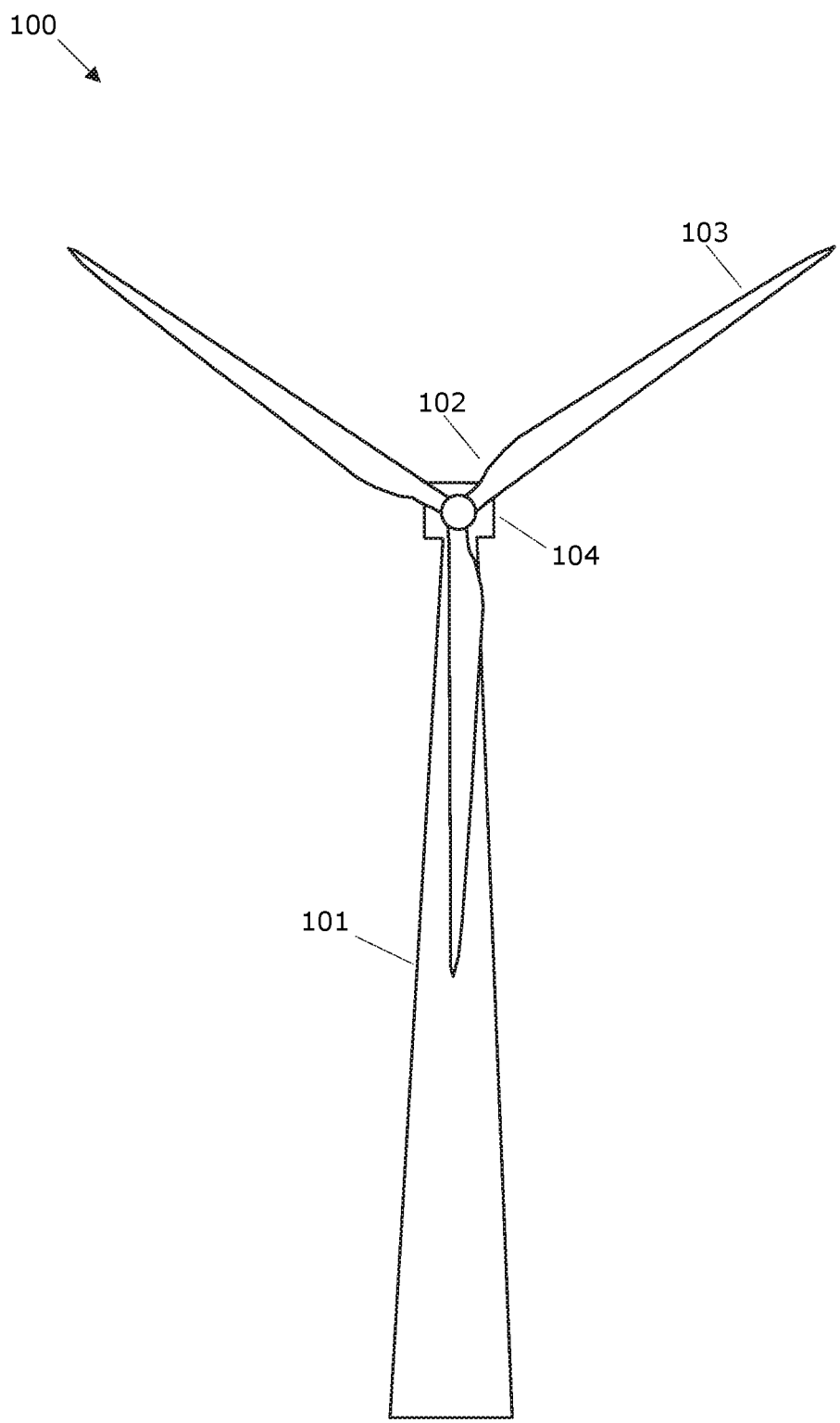
FIG. 1 schematically shows a wind turbine generator.

FIG. 1 shows a wind turbine generator, WTG, 100 comprising a tower 101 and a rotor 102. The rotor comprises three rotor blades 103 however the number may vary, and there may be two, four or even more blades. The rotor is connected to a nacelle 104 which is mounted on top of the tower 101 and being adapted to drive an electrical generator situated inside the nacelle. The rotor 102 is rotatable by action of the wind. The wind-induced rotational energy of the rotor blades 103 is transferred via a shaft to the electrical generator. Thus, the WTG 100 is capable of converting kinetic energy of the wind into mechanical energy by means of the rotor blades and, subsequently, into electric power by means of the electrical generator. The electrical layout of the WTG may in addition to the electrical generator include a power converter. The power converter is connected in series between the electrical generator and the electrical grid for converting the variable frequency generator AC power into a grid frequency AC power to be injected into the utility/electrical grid. The electrical generator is via the power converter controllable to produce a power corresponding to a power request.

The blades 103 can be pitched in order to alter the aerodynamic properties of the blades, e.g. in order to maximize uptake of the wind energy. The blades are pitched by a pitch system, which may include actuators for pitching the blades dependent on a pitch request.

A WTG is, in normal operation, set to capture as much power from the wind, at any given wind speed, this works as long as the power production is below the rated power limit for the WTG, i.e. partial load operation. When the wind speed increases above rated wind speed, often designed at 10-12 m/s, the WTG has to pitch the blades 103, so that the energy captured is stable at rated power, even if the wind is well above rated wind speed.

To ensure as much as possible energy yield, during partial load the electric power setpoint Preq is set such that a tip speed ratio, $\lambda$, for the rotor 102, is maintained at its optimal value, $\lambda_{opt}$.

Terms like tip speed ratio and optimal tip speed ratio are known to the skilled person.

The partial load state may be selected if the wind speed is not high enough to enable generation of the nominal or rated electrical power from the electrical generator, in other words the energy in the wind is resulting in an available power (e.g. represented by an available power value). In this state the pitch $\theta$ and the generator speed are controlled to optimize aerodynamic efficiency of the WTG 100. Therefore, the pitch request $\theta$req may be set to an optimum pitch reference $\theta$opt which maximizes the aerodynamic efficiency of the rotor. The generator speed $\omega$r may be controlled to extract as much power as possible by tracking the desired generator speed $\omega$ref. In the partial load state the generator speed $\omega$r is controlled via the power request Preq which affects generator torque.

Accordingly, in partial load, the partial load controller calculates the power request Preq that minimizes the difference between the generator speed reference $\omega$ref and the measured generator speed $\omega$m.

The full load state may be selected if the wind speed v is high enough to enable generation of a rated electrical power. Therefore, the generator speed and generator power may be controlled to achieve a desired power production, e.g. a rated power or a reduced power. The power request Preq is set to the desired power production. The generator speed reference $\omega$ref may be determined dependent on the desired power production and possibly limited to a maximum rated speed. In the full load state the generator speed $\omega$r is controlled via the pitch request $\theta$req.

Accordingly, in full load the full load controller calculates the pitch request $\theta$req that minimizes the difference between the generator speed reference $\omega$ref and the measured generator speed $\omega$m.

The rated power level is the power level that the WTG is designed to operate at or above rated wind speed. In some circumstances, the WTG may be operated to generate a maximum power, which is higher than the rated power. This situation may be called power overboost operation and can last a limited amount of time in accordance with the WTG design capabilities. During overboost operation the WTG cannot extract enough energy from the wind to generate the required power therefore the kinetic energy stored in the turbine rotor is used hereby lowering the kinetic energy in the rotor.

Fast active power changes from the available sources can be required by the grid operator in situations when the grid frequency is out of normal operational range, most often for low frequency situations but also in case of high frequency events.

For low frequency situations it applies that an urgent requirement for additional power to the electrical grid calls for a fast active power injection from available power sources in the grid, such as wind power plants with a plurality of WTGs. This fast power injection may be called power boost event.

In order to provide a fast response time for the boost event, embodiments of the invention provide a method and wind power plant described in embodiments in the following description.

In an embodiment there is a wind power plant, WPP, with a plurality of WTGs, where a power plant controller, PCC, controls the WPP.

The PPC is a control system of a WPP which has the responsibility to control Active Power (P) and Reactive Power (Q) at the Point of Interconnection (POI) with the electrical/Utility Grid (UG). The P and Q quantities are the means by which other system parameters can be influenced, such as the grid frequency (f) and voltage (V).

The controller structure has as inner loops the P and Q control, and as outer loops the f and V control. The controller structure is not shown, but this is known to the skilled person in the art.

Besides the core functionalities described above, the PPC is also responsible for other WPP functionalities which are required either by the Transmission System Operator (TSO) or the WPP owner.

The Active Power control loop is responsible for controlling P at the POI. This inner loop can be used to influence the grid frequency by adding appropriate external control loops (primary frequency regulation, fast frequency response and inertia emulation response). Power Oscillation Damping can be achieved as well, by adding an appropriate external control loop.

Inertia Emulation Controller (IEC) is an external loop to the active power controller and it provides means of reacting to fast frequency contingencies in the power/electrical grid.

It receives as main inputs:
measured frequency at a point of measurement
feedback signals from each of the WTGs
The PPC outputs the following power references:
Active Power Reference to be sent to the Wind Turbines via the PPC Active Power Dispatcher (for the WTG normal power reference handle)
Overboosting Active Power Reference to be sent to the Wind Turbines via the PPC Overboosting Dispatcher
The PPC outputs the following signals:
handle flag for the WTG to choose a certain ramp rate limitation of the active power reference
enable signal for the WTG OB function This means that two power references are sent to the WTGs from PPC, i.e. a normal Active Power Reference and an Overboosting Active Power Reference.

Figure 2:
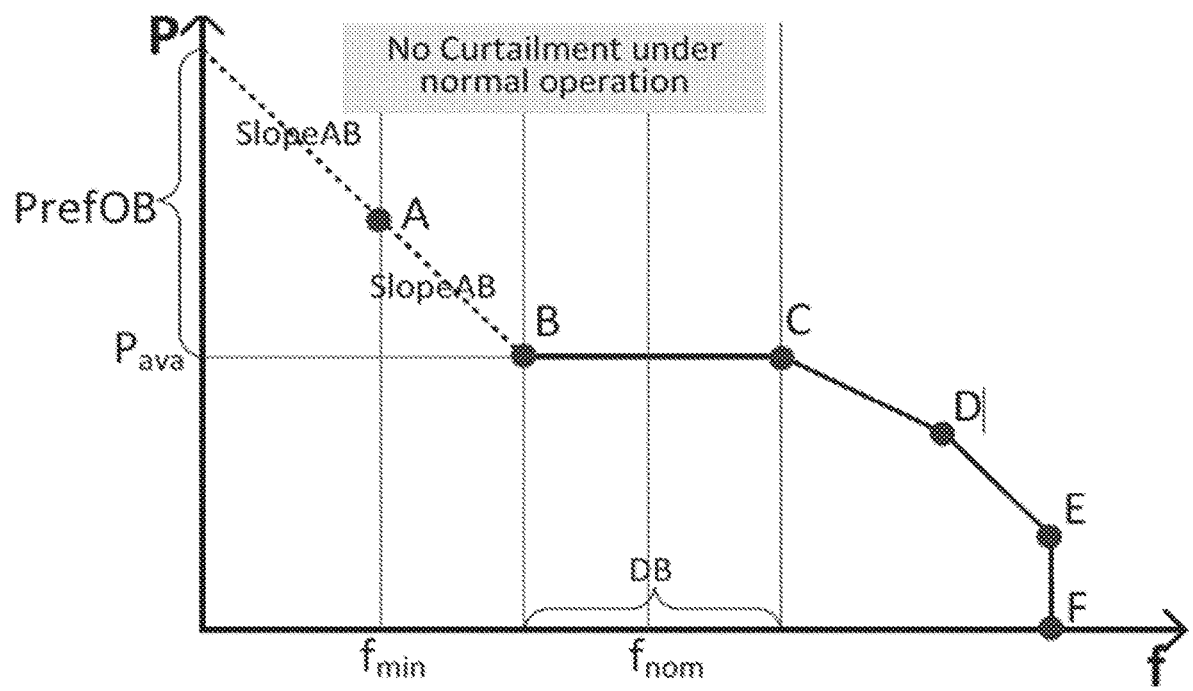
FIG. 2 schematically shows a P-f curve in a non-curtailed mode.

The Overboost (OB) concept can be interpreted by the dashed P-f lines in FIG. 2.

Basically, the P-f operation curve in FIG. 2 is followed all the time. The frequency controller according to prior art follows the solid part of the P-f lines in FIG. 2, i.e. the segment from B to F.

When under frequency, UF, events happen, the WTGs' OB capability can support WPPs with extra P production, accordingly the P-f operation curve can be further extended on the UF side, which is shown as the dashed lines in FIG. 2.

Figure 3:
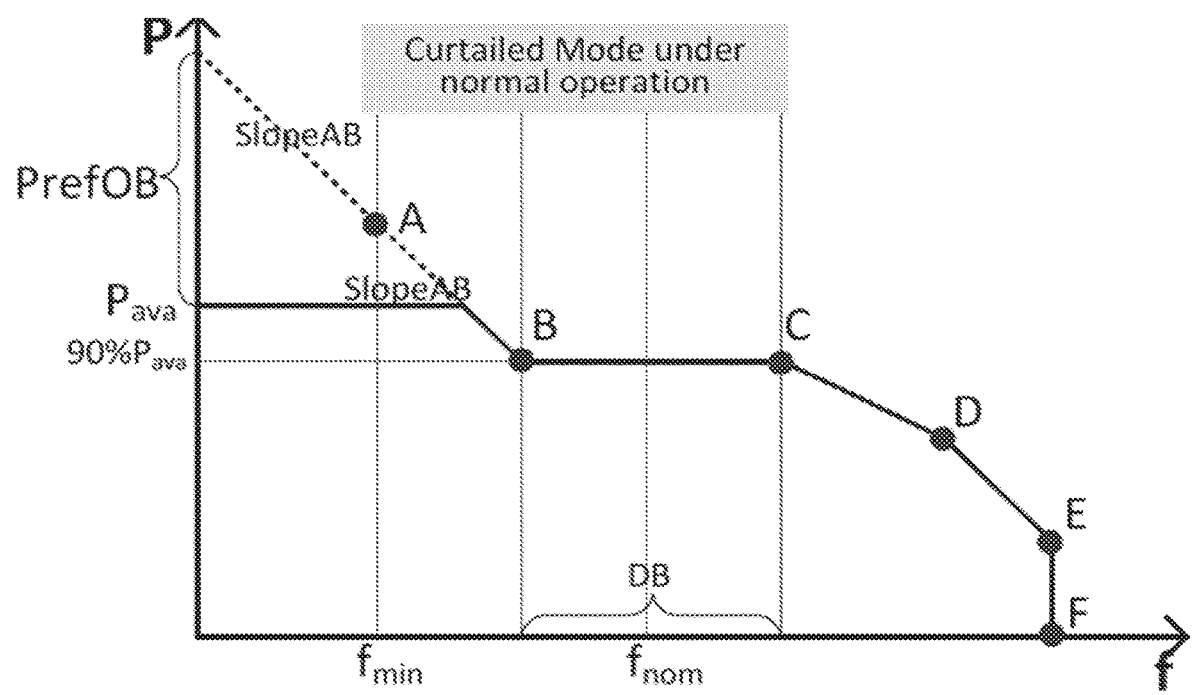
FIG. 3 schematically shows a P-f curve in a curtailed mode.

For situations, FIG. 2, when the WPP is operating without de-rating operation under Frequency dead-band (DB), i.e. frequencies below Fnom, then OB can be requested when the frequency exits DB range on the under frequency side, by following the SlopeAB segment. For other situations, as for FIG. 3, if there is de-rating operation under DB, then OB can be requested when frequency is low enough and the reserved power is already consumed, by following the SlopeAB segment of FIG. 3.

In this design, the frequency controller generates the normal P reference (PrefFreq) for WTGs' normal P production, and the OB related P reference (PrefOB). Together with this PrefOB, an "OBFlag" indicating the validity of the OB request is generated, and the IEC uses this functionality.

The advantage of using the OBflag is that the PrefOB can be neglected as long as the OBflag is low, also the can OBflag change the operation of the individual WTGs when received.

Figure 6:
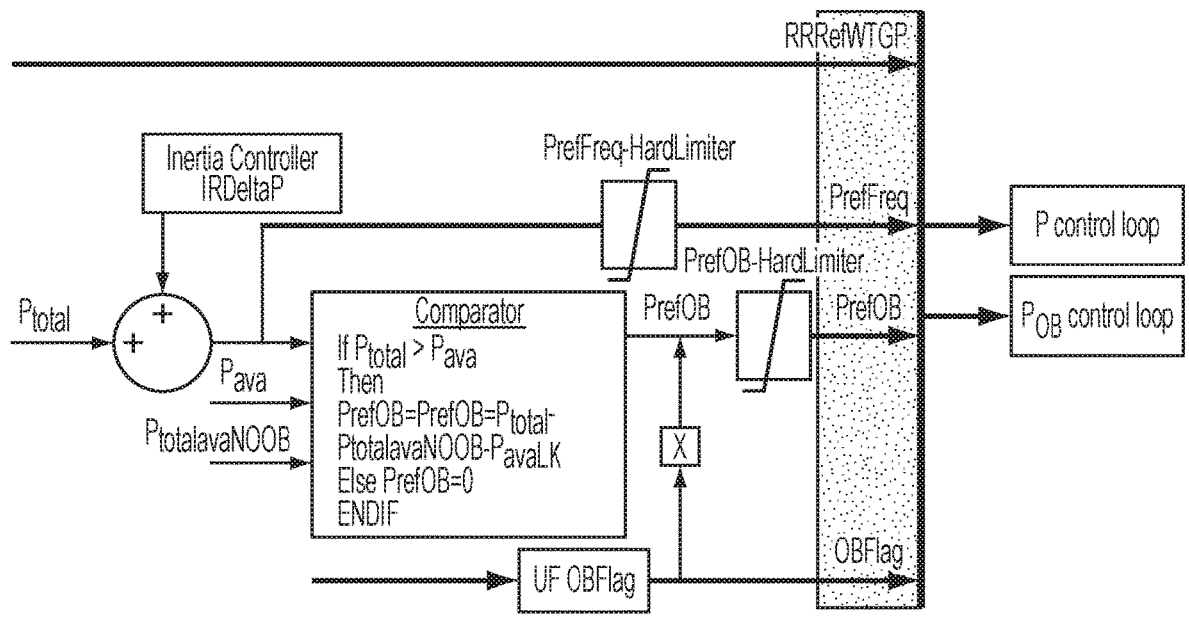

When the IEC is enabled, the primary frequency controller is utilized as the proportional function part for the inertia control. From the structure respective of the combined frequency and inertia controller, the inertia controller contributes an extra amount of power reference (IRdeltaP) on top of the plant power reference (Ptotal) generated by the frequency controller, as illustrated in FIG. 6. Therefore the final power references (PrefFreq, PrefOB) from the frequency controller are mixed outputs from the primary frequency controller and the inertia controller.

Inertia Emulation Controller, IEC, is a control structure e.g. within the PPC, which is aimed to support the WPP during frequency deviations caused by fast power changes in the system (i.e. generator or load disconnection). This controller does not try to accurately replicate the behaviour of grid connected synchronous generators during such frequency events, but rather to provide means for the WPPs to support the power grid in a similar manner.

In order to do that, the Inertia Emulation Controller, IEC, monitors the frequency deviations from nominal frequency as well as its rate of change of frequency (i.e. ROCOF). Based on the ROCOF, the controller should calculate a power reference change (i.e. increase/decrease) that should be provided by the WPP on top of its actual produced power, with a high rate as specified by the grid codes. The power change varies with the ROCOF.

During downwards frequency deviations (i.e. frequency below the nominal level), the fast injection of additional power in the system will help reducing its ROCOF. Therefore, the primary frequency controllers of the power plants connected to the system will have time to react and the maximum deviation from nominal frequency is reduced.

The same principle applies during upwards frequency deviations, with the difference that power injection level in the system is reduced.

Inertia Emulation Controller, IEC, includes a triggering function which monitors the frequency deviation and the ROCOF in order to trigger the controller.

Figure 4:
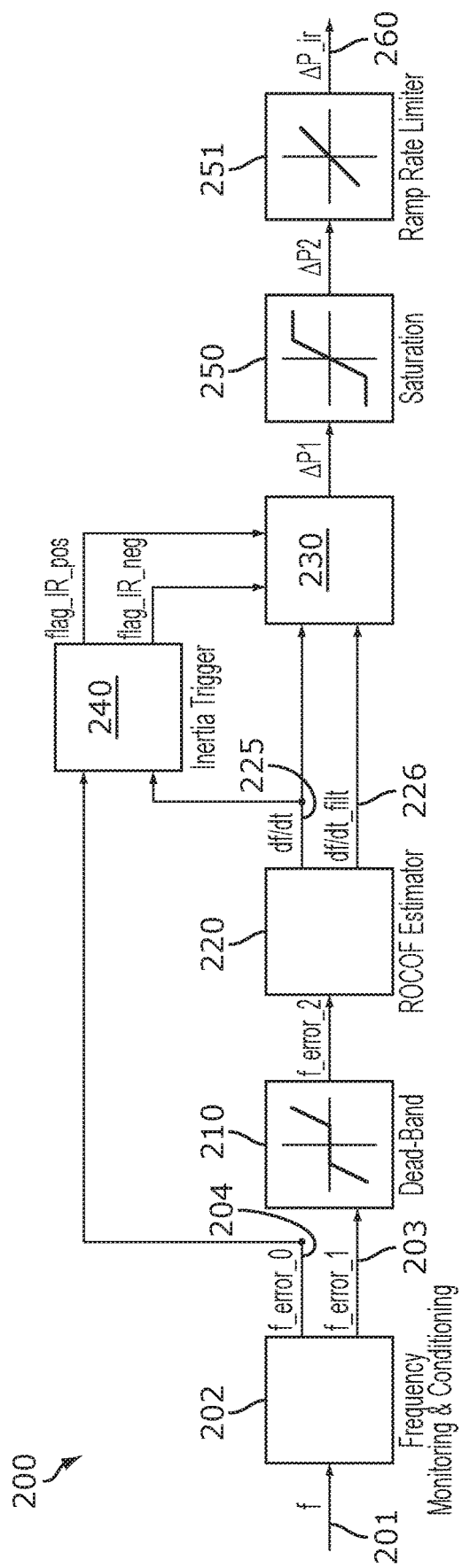
FIG. 4 schematically shows a control system of the wind turbine generator in particular, how the "inertial" reference is generated, FIG. 5 schematically shows the frequency control structure and the IEC controller implemented in the P-f loop, FIG. 6 schematically shows the frequency control structure and the remaining part of the IEC controller implemented in the P-f loop, FIG. 7 schematically shows a time trace of how the wind turbine generator will behave under a request for inertial response according to an embodiment, FIG. 8 schematically shows a time trace of how the wind turbine generator will behave under a request for inertial response according to an embodiment where reduced power is available, and FIG. 9 schematically shows time trace of an event.

FIG. 4 shows a simplified high-level diagram of the Inertia Emulation Controller. It consists of several blocks as follows: Frequency Monitoring & Conditioning 202, Dead-Band 210, ROCOF Estimator 220, Inertia Trigger 240, ΔP Calculator 230, Saturation 250, and Ramp Rate Limiter 251.

FIG. 4 shows an embodiment of the invention. The Inertia Controller 200 contains the following blocks:

1) Frequency Monitoring and Conditioning block 202—responsible for obtaining a frequency error signal 203 and a frequency error conditioning signal 204, both based on an actual frequency input 201. The frequency input can be based on a frequency measurement.

2) Dead-Band block 210—responsible for defining a frequency area where the Inertia Emulation Controller 200 will not react, i.e. if the frequency is within a narrow band around the grid frequency, no action is required.

3) Rate of change of frequency, ROCOF, Estimator block 220 responsible for calculating the rate of change of the frequency.

The ROCOF Estimator function outputs three signals that are calculated on three separate branches, based on a frequency error signal. Each of the three branches serves a specific purpose.

The first branch 225 estimates the rate of change of the frequency error signal using a discrete derivative block. The estimated the rate of change of the frequency goes through a dead-band block, which is aimed to provide an area where the output of the branch is zero. This is used to provide robustness to noise in the frequency error signal. The signal produced by this branch is used by the triggering function 240. Each of the other two branches 225 and 226 has a filter applied in series with the derivative block. Each filter serves a specific purpose. The filter applied on branch 225 has the role of delaying the frequency error signal such that the duration of the power reference change signal calculated in block 230 can be controlled. The filter applied on branch 226 has the role of filtering out the noise, and thus provide a cleaner signal to the power reference change calculation block 230.

The derivative is very sensitive to noise, so one can use the execution time of the discrete derivative to reduce the effect of the noise on the derivative block.

The estimation of the ROCOF can be made in many different ways, and prior art shows many solutions to estimation of the ROCOF.

Figure 5:
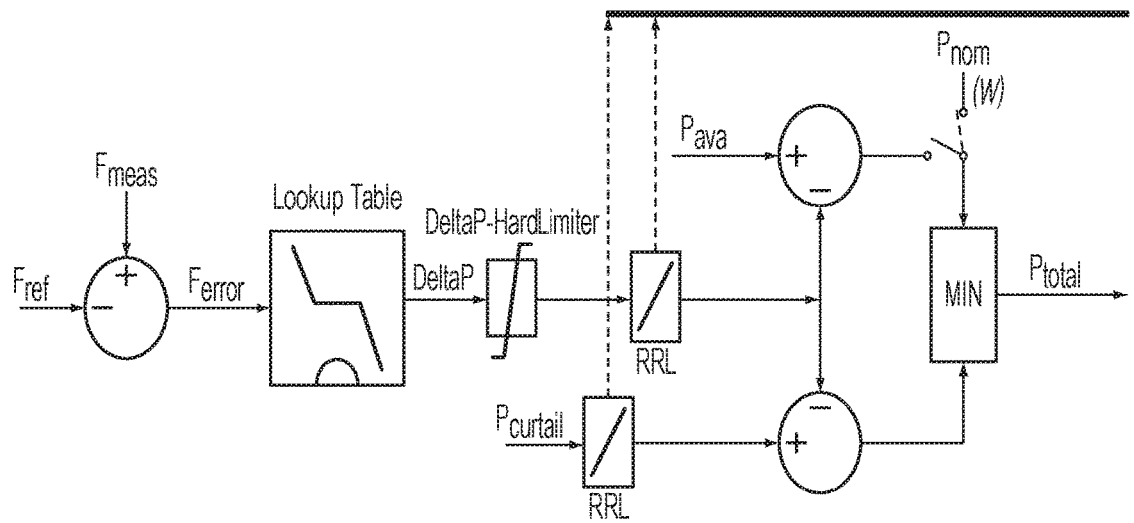

4) Inertial Response Power Calculator block, delta_P 230 responsible for obtaining the amount of power that needs to be provided by the WPP as a function of the existing frequency conditions. This includes a fixed power amount or a variable power amount that is based on the ROCOF. As shown in FIG. 5 and FIG. 6, the final power reference to be distributed to the wind turbine generators can also include a proportional part given by the frequency controller.

5) Inertia Trigger block 240—responsible for deciding when the additional power needs to be provided 6) Saturation block 250—responsible with providing the means to saturate the additional power signal.

This block acts as a saturation block applied to the signal delta_P, limiting its value according to a parameter setting.

7) Ramp Rate Limiter block 251—responsible with limiting the rate of change of the additional power signal The block 251 acts as a ramp rate limiter block applied to the saturated signal delta_P_IR, limiting its rate of change according to a parameter setting.

The additional function looks at different ramp rate limits in the frequency controller and decides what ramp rate setting should be sent to the WTGs. The additional function receives a ramp rate value from the IEC that should be set to WTGs during inertia events.

In an embodiment of the invention, an additional function is implemented. This function is responsible for deciding which ramp rate the WTG should use for its power reference PrefFreq. The function makes it possible to change the WTGs ramp rate from the power plant controller or even from a remote system operator.

This additional function resides in the structure shown in FIG. 5 and FIG. 6, i.e. in the Frequency Controller.

Its purpose is to control the ramp rate limitation of the WTG for the normal power reference PrefFreq."

In an embodiment, when the inertia event is triggered, a "delta_P" power is generated based on the actual frequency profile. This "delta_P" power must be added on top of the actual power produced by the WPP in the moment when the inertia event is triggered.

In another embodiment, when the inertia event is triggered, a "delta_P" power is generated independent on the actual frequency profile.

In one embodiment it is necessary to distinguish between the wind turbine generator being curtailed and not curtailed, in order to produce this active power increase:

1a) Turbine is curtailed. In this case, when a request for power increase is received, the WTG will first use the normal power reference handle (i.e. it will listen to the normal power reference received from the PPC (i.e. Pref=P_nominal) and the ramp rate setting received from the PPC). When the turbine production has reached its capability (i.e. Power production equals Power available (Pava)), the WTG is using the overboosting handle and tries to provide the requested power with the overboosting handle. Pref_OB is calculated having in mind the Power available.

2a) If the WTG is not curtailed, then of course the only option is to use the overboosting handle in order to provide the requested power increase.

FIG. 5 and FIG. 6 shows an embodiment of the Power loop. FIG. 6 shows how the requested power (plant power reference) Ptotal is added together with IRdeltaP, i.e. 260 from FIG. 4. The addition forms a Ptotalref, and this signal can be limited in a limit function to PrefFreq. A comparator selects based on rules or functions the overboost reference (PrefOB), inputs to the comparator is the available power and the total available power for the WTGs with no OB capability.

The algorithm of calculating PrefOB starts to compare the total P with the total available power for the WTGs which have OB capability (PtotalavaOB), and the total available power for the WTGs which have NO OB capability (PtotalavaNOOB). The reason of considering PtotalavaNOOB is because the group of WTGs without OB capability could still follow wind to generate certain amount of P to contribute Ptotal to some extent, then PrefOB may be mitigated sometimes. Consequently the result of (Ptotal—PtotalavaNOOB) should be compared with PtotalavaOB to calculate PrefOB.

Another fact regarding the WTGs which execute the OB is that they do not follow wind anymore and their wind-based P production have been locked from the moment they start to execute OB, thus PtotalavaOB is locked from the moment the OB execution starts. In other words, the locked PtotalavaOB should be used to calculate PrefOB. A variable PavaLK is used to represent the locked PtotalavaOB in this design.

In FIG. 6 an OB flag is used to signal the OB event to the WTGs and also to enable the overboost reference (PrefOB) to be transmitted to the WTGs in the dispatcher.

In other embodiments, the OB flag is not present and the overboost reference (PrefOB) is always transmitted, and the WTGs act upon receiving the overboost reference (PrefOB).

In a further embodiment, the overboost handle of the WTG is used first. The overboost capability of the WTG is monitored and when this capability decreases under a certain level (or alternatively, after a certain predetermined period of time) the handle is gradually changed from the overboost handle to the power reference handle. That is done by ramping down the overboost reference and accordingly ramping up the power reference.

In another embodiment, the overboost enabling signal to the WTGs can be disabled as soon as the overboost reference has reached zero, and thus avoiding the WTG to loose kinetic energy (i.e. the rotor speed will not decrease)—only if the overboosting power level is above the available power. Alternatively, the overboost enabling signal can be kept high until the end of the inertia sequence request, accepting the risk that in this case, if the overboost power level is above the available power, during the WTG recovery period the power will drop much below the initial level, when the inertia response was initiated.

Figure 7:
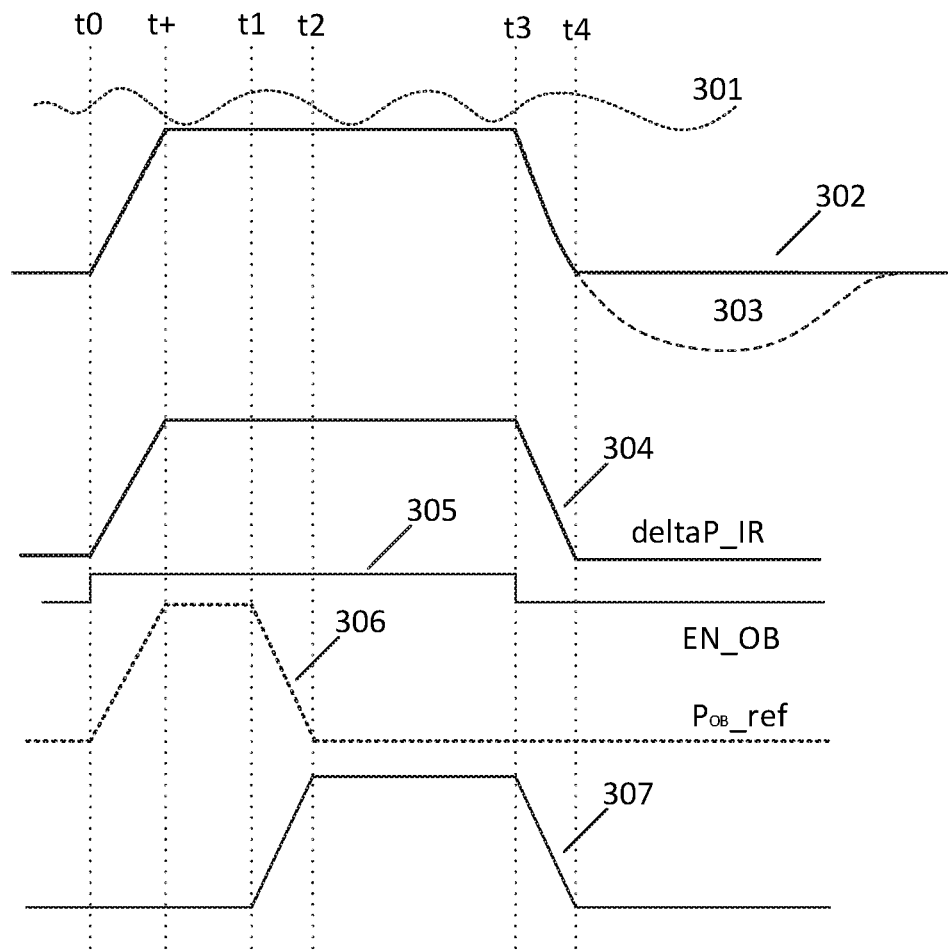
Figure 8:
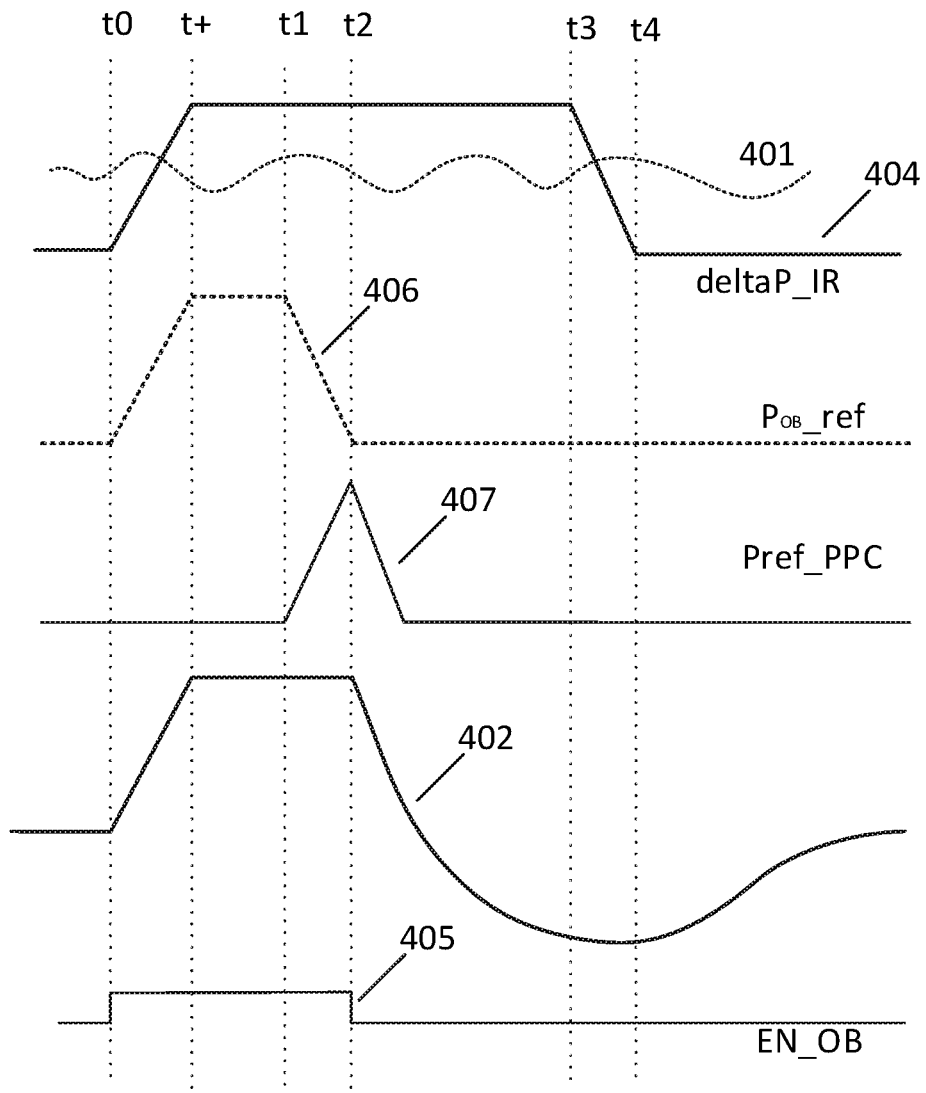

FIGS. 7 and 8 are representing the above discussion where a method of using two handles to operate the WPP during an overboost event is applied.

In FIGS. 7 and 8, two cases (i.e. when the power increase is above available as well as when the power increase is below available) are represented.

FIG. 7 shows an embodiment during a situation where available power 301 is higher than the power reference 302, i.e. actual power in case EN_OB 305 is active from t0 to t3, and the overboost capacity is sufficient.

The flag or input signal enable overboost EN_OB 305 is set at time t0 and an amount of delta power is calculated for the inertial response, deltaP_IR 304.

The overboost power P_OB_ref 306 is ramped at t0 and has reached maximum at time t+. As the EN_OB flag remains high, the request for boost power is still present, so even though the overboost power P_OB_ref starts to decline at time t1, as the overboost power decreases, the power reference takes over the requested delta power, as the power reference increases, so when adding up overboost power and power equals the requested deltaP_IR. At time t2 the overboost power is zero, and the power reference Pref_PPC 307 follows the deltaP_IR until t3 where enable overboost EN_OB goes low and deltaP_IR is ramped down to zero.

The power reference Pref_PPC is normally not zero, but will return to a reference reflecting the power requirement at the current situation.

The curve 302 shows the resulting power output as function of time, and the curve 303 shows a potential power under swing caused by a loss in kinetic energy, in case the available power is under the required power, which is not the case here.

FIG. 8 shows an embodiment during a situation where available power 401 is lower than the power reference, i.e. actual power in case EN_OB 405 is active from t0 to t2, and the overboost capacity is insufficient.

The flag or input signal enable overboost EN_OB 405 is set at time t0 and an amount of delta power is calculated for the inertial response, deltaP_IR. The amount of delta power in FIG. 7 and FIG. 8 may not be equal.

The overboost power P_OB_ref 406 is ramped at t0 and has reached maximum at time t+. As the EN_OB flag 405 remains high, the request for boost power is still present, so even though the overboost power P_OB_ref 406 starts to decline at time t1, as the overboost power decreases, the power reference takes over the requested delta power, as the power reference increases, so when adding up overboost power and power equals the requested deltaP_IR.

At time t2 the overboost power is zero, at the time the actual power 402 from the wind turbine generator starts to drop as the power available in the wind is less than the requested power, the increased power delivered until time t2 is captured by a decreased rotor speed, where the rotational kinetic energy is used as an inertial reserve. As the WTG starts to loose speed the EN_OB flag 405 is set to zero and the WTG starts a recovery routine, where the produced power is less than the power prior to the inertial response event. The lower power production helps to the WTG 100 to gain rotational speed of the rotor 102, so the WTG can operate in normal operational mode again after some seconds.

In an embodiment, the power plant controller receives signal from the WTGs, which return information about each of the wind turbines' capability to maintain an increased power production.

These signals may include an:
Overboost capability signal
Available power

Based on the returned information the power plant controller calculates how many of the plurality of WTGs in the wind power plant that has to be used in order to provide the requested inertial support.

As mentioned, the inertia controller contains a block called Additional Power Calculator, delta_P 230. This block is responsible for generating a power increase of the WPP in accordance with the actual frequency conditions in the power system to which the WPP is connected.

The method mentioned below is one method to derive the required power requested during the inertial response. Other methods may be similar and the invention is not limited to the disclosed embodiments of the method.

Block 230 calculates the power change that must be produced by the WPP during inertia type frequency events. The Delta_P_IR Calculation block 230 is based on two different types of power reference generation. The first type is generating the power reference change when inertia control is triggered, based on the calculated ROCOF.

In an embodiment there are two types of power reference generation which can be combined to act together or separately, by appropriately setting up "Inertia Trigger" blocks, to decide on when to trigger an inertia control event where boost power is released.

In an embodiment, alternatively to the above mentioned method of using both handles, only the overboost handle is used for downwards frequency deviations.

In an embodiment the Inertia controller will be used for both directions of frequency deviations (i.e. positive and negative) in order to minimize the impact of load/generation changes in the power system, by reducing its ROCOF and in this way avoiding assets disconnection from the grid.

Depending on the situation, it might be useful, in an event of an upwards frequency deviation, to use the overboost capability of the WTG to provide exactly the same power decrease as requested by the inertia controller. Such situation may occur in high frequency situations with fluctuating wind.

Figure 9:
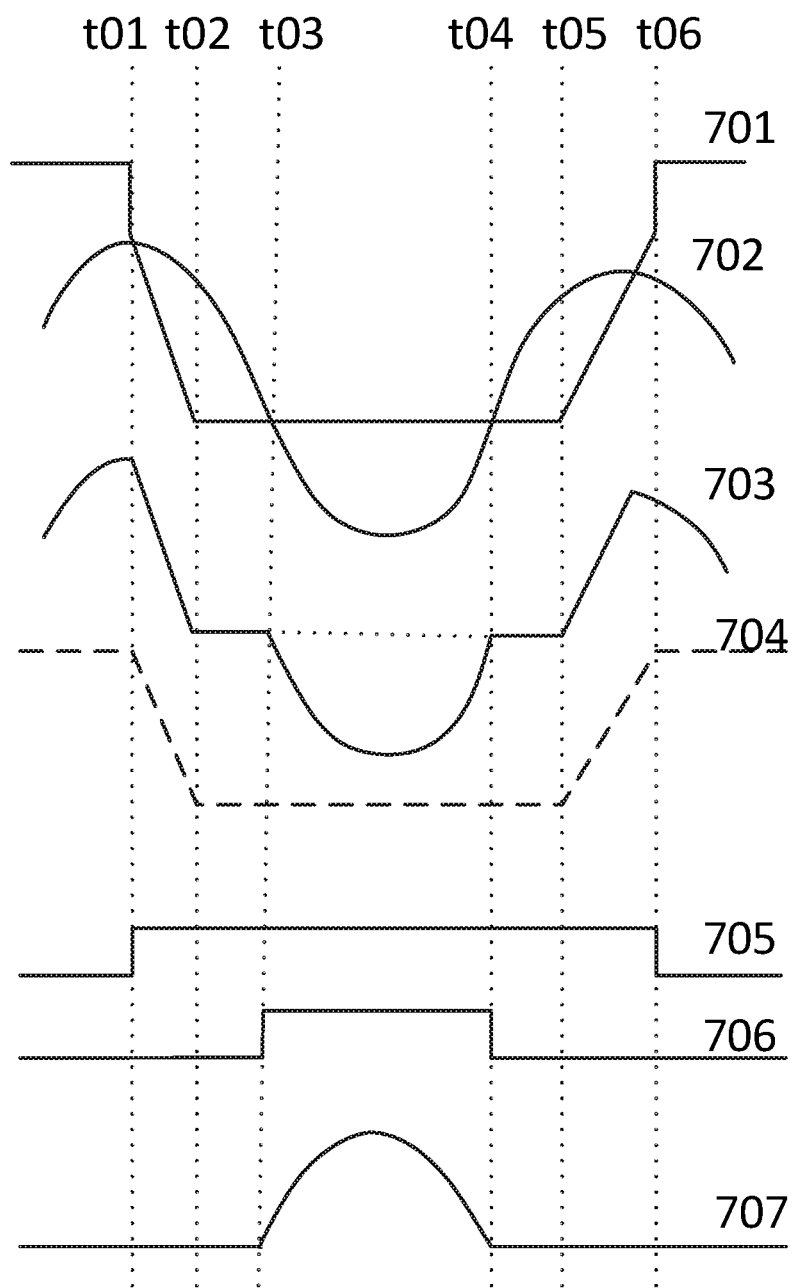

FIG. 9 shows a situation where the inertia controller handles an over frequency situation with fluctuating wind condition causing the produced power to variate.

The available power is depictured in trace 702, where the power reference is shown in trace 701. Prior to time t01 the Power reference 701 is in fact higher than the available power 702. The inertia event request is enabled by the inertia event request 705, the signal goes high at time t01 and low at time t06. As the example shows an over frequency situation, the change in power level given by the inertia controller (deltaP_IR) 704 is in fact negative, thus the power reference 701 is reduced by a slope from t01 to t02.

As can be seen in FIG. 9, prior to the inertia event request, prior to t01, the power production 703 is at maximum level, i.e. given by the available power 702. The over-frequency event occurs generating an inertia event request 705 at time t01. The power reference 701 is therefore formed by summing up the frozen value of the actual power production level and the power level given by the inertia controller (deltaP_IR) 704. Given the shape of the available power 702, the resulting power production will be as in 703.

If during this inertia response, the available power decreases, the overboost enable signal (EN_OB) 706 can be switched on between t03 and t04 such that during the available power decrease 702, the power is maintained at the requested value, by using the overboost handle of the WTG (i.e. by extracting the requested power from the rotor kinetic energy). This is done by activating the WTGs overboost enable flag 706 as mentioned above, and the WTGs provide an overboost power 707 according to a PrefOB reference.

In case the WTG is operating curtailed operation mode (i.e. the power production is below the total available power in the wind), both handles of the WTG can be used (i.e. the power reference handle and the overboost handle).

While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the scope of the invention as defined by the appended claims. Any range or device value given herein may be extended or altered without losing the effect sought, as will be apparent to the skilled person. As disclosed above, the electrical value of the electrical grid may be a frequency value. Thus, the electrical value may be a value of the frequency of the electrical grid.

Embodiments of invention can be implemented by means of electronic hardware, software, firmware or any combination of these. Software implemented embodiments or features thereof may be arranged to run on one or more data processors and/or digital signal processors. Software is understood as a computer program or computer program product which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium. Accordingly, the computer program comprises software code portions for performing the steps according to embodiments of the invention when the computer program product is run/executed by a computer or by a distributed computer system.

Individual features mentioned in different claims or embodiments, may possibly be advantageously combined.

The invention claimed is:

1. A method for controlling a wind power plant comprising a plurality of wind turbine generators connected to an electrical grid, the method comprising:
    determining an inertia delta power reference required for the wind power plant to meet a power demand in response to a change in an electrical value of the electrical grid;
    determining a power reference based on the inertia delta power reference and a plant power reference;
    determining an overboost reference based on the power reference and an available power value;
    delivering the power reference to each of the plurality of wind turbine generators;
    delivering the overboost reference to each of the plurality of wind turbine generators; and
    adjusting a power output of one of the plurality of wind turbine generators based on at least one of the power reference or the overboost reference.

2. The method according to claim 1, wherein the electrical value is a frequency value.

3. The method according to claim 1, further comprising:
    dispatching an overboost flag to each of the plurality of wind turbine generators, wherein the plurality of wind turbine generators initiate an overboost according to the overboost reference received.

4. The method according to claim 1, wherein the power reference or the overboost reference can include a time dependent ramp rate function with a predetermined ramp rate.

5. The method according to claim 1, further comprising:
    ramping down the overboost reference after a predetermined time period.

6. The method according to claim 1, further comprising:
    updating the power reference by combining the plant power reference with a negative inertia delta power reference;

comparing the available power value with the power reference; and
dispatching the overboost reference to command an increase in power production, when the power reference is greater than the available power value.

7. A method for controlling a wind turbine generator connected to an electrical grid, the wind turbine generator having a rotor, the method comprising:
    adjusting, via a power reference and an overboost power reference of a wind turbine control system, power produced by the wind turbine generator,
    wherein the power reference is based on an inertia delta power reference and a plant power reference,
    wherein the inertia delta power reference is based on a power required for the wind turbine generator to contribute to a wind power plant to meet a power demand in response to a change in an electrical value of the electrical grid,
    wherein the overboost power reference is based on the power reference and an available power value, and
    wherein the wind turbine generator responds to the overboost power reference before responding to the power reference.

8. The method according to claim 7, wherein the overboost power reference initiates overboosting in the wind turbine generator, wherein the overboosting comprises using rotational kinetic energy stored in the rotor.

9. The method according to claim 8, further comprising:
    disabling, via the wind turbine control system, the overboost power reference in response to a speed of the rotor exceeding a speed threshold.

10. The method according to claim 7, wherein adjusting the power produced by the wind turbine generator comprises decreasing the overboost power reference and increasing the power reference.

11. A control system for controlling the power output of a wind power plant including a plurality of wind turbine generators connected to an electrical grid, the control system comprising:
    one or more computer processors configured to:
    set a plant power reference;
    determine an inertia delta power reference required for the wind power plant to meet a power demand in response to a change in an electrical value of the electrical grid;
    determine a power reference based on the inertia delta power reference and the plant power reference;
    determine an overboost power reference based on the power reference and an available power value;
    deliver the power reference to each wind turbine generator of the plurality of wind turbine generators;
    deliver the overboost power reference to each of the plurality of wind turbine generators; and
    adjust a power output of one of the plurality of wind turbine generators based on at least one of the power reference or the overboost power reference.

12. A wind power plant comprising:
    a plurality of wind turbine generators connected to an electrical grid; and
    a control system for controlling a power output of the wind power plant to the electrical grid, the control system comprising:
    one or more computer processors configured to:
    determine a power reference based on (i) an inertia delta power reference required for the wind power plant to meet a power demand in response to a change in an electrical value of the electrical grid and (ii) a plant power reference;

determine an overboost power reference based on the power reference and an available power value;

deliver the power reference to each of the plurality of wind turbine generators; and deliver the overboost power reference to each of the plurality of wind turbine generators; and adjust a power output of one of the plurality of wind turbine generators based on at least one of the power reference or the overboost power reference.

13. The wind power plant according to claim 12, wherein the electrical value is a frequency value.

14. The wind power plant according to claim 12, further comprising:

dispatching an overboost flag to each of the plurality of wind turbine generators, wherein the plurality of wind turbine generators initiate an overboost according to the overboost power reference received.

15. The wind power plant according to claim 12, wherein the power reference or the overboost power reference comprises a time dependent ramp rate function with a predetermined ramp rate.

16. The wind power plant according to claim 12, further comprising:

ramping down the overboost power reference after a predetermined time period.

17. The wind power plant according to claim 12, further comprising:

updating the power reference by combining the plant power reference with a negative inertia delta power reference;

comparing the available power value with the power reference; and dispatching the overboost power reference to command an increase in power production, when the power reference is greater than the available power value.

* * * * *